United States Patent
Kriech et al.

(10) Patent No.: US 10,053,820 B2
(45) Date of Patent: *Aug. 21, 2018

(54) BINDER COMPOSITION FOR IMPROVED TACK COAT AND STRESS ABSORBING MEMBRANE INTERLAYER APPLICATION FOR ROAD CONSTRUCTION

(71) Applicant: Heritage Research Group, Indianapolis, IN (US)

(72) Inventors: Anthony J. Kriech, Indianapolis, IN (US); Marvin Exline, Terre Haute, IN (US); James Joseph Cunningham, Greensburg, PA (US); Andreas Redick Horton, Plainfield, IN (US)

(73) Assignee: Heritage Research Group, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,604

(22) Filed: Jun. 14, 2017

(65) Prior Publication Data
US 2017/0356136 A1    Dec. 14, 2017

Related U.S. Application Data

(60) Provisional application No. 62/349,875, filed on Jun. 14, 2016.

(51) Int. Cl.
*E01C 7/00* (2006.01)
*E01C 7/32* (2006.01)
(Continued)

(52) U.S. Cl.
CPC ............. *E01C 7/325* (2013.01); *C08L 95/00* (2013.01); *E01C 7/32* (2013.01); *E01C 19/12* (2013.01);
(Continued)

(58) Field of Classification Search
CPC . E01C 7/18; E01C 7/325; E01C 11/02; E01C 11/24; E01C 7/30; E01C 7/32;
(Continued)

(56) References Cited

U.S. PATENT DOCUMENTS

| 6,113,309 A * | 9/2000 | Hollon | E01C 19/006 180/20 |
| 7,503,724 B2 * | 3/2009 | Blacklidge | C08L 95/005 404/101 |

(Continued)

FOREIGN PATENT DOCUMENTS

KR    101412510 B1    6/2014

OTHER PUBLICATIONS

International Search Report and Written Opinion from corresponding PCT application No. PCT/US2017/037439 dated Aug. 29, 2017 (14 pgs).

*Primary Examiner* — Raymond W Addie
(74) *Attorney, Agent, or Firm* — Brinks Gilson & Lione

(57) ABSTRACT

A binder composition for asphalt pavements that includes: an asphalt binder; an elastomeric polymer; a wax modifier; and optionally at least one of: i) fumed silica or fumed alumina; and ii) a saponified fatty acid and a resin acid gelling compound. The composition is applied as a tack coat and/or a stress absorbing membrane interlayer and is non-tracking.

14 Claims, 1 Drawing Sheet

(51) Int. Cl.
*E01C 19/12* (2006.01)
*C08L 95/00* (2006.01)

(52) U.S. Cl.
CPC ....... *C08L 2555/50* (2013.01); *C08L 2555/54* (2013.01); *C08L 2555/60* (2013.01); *C08L 2555/80* (2013.01)

(58) Field of Classification Search
CPC .. C08L 95/00; C08L 2555/84; C08L 2555/60; C08L 2555/50; C08L 93/00; C08L 91/06; C08L 101/12
USPC .......................... 404/17, 31, 72, 75, 107, 111
See application file for complete search history.

(56) References Cited

U.S. PATENT DOCUMENTS

| | | | |
|---|---|---|---|
| 7,927,038 B2* | 4/2011 | Dawson | E01C 11/103 404/107 |
| 2011/0206455 A1 | 8/2011 | Blacklidge | |
| 2013/0172452 A1 | 7/2013 | Corcoran et al. | |
| 2013/0279981 A1* | 10/2013 | Rogan | E01C 19/16 404/101 |
| 2014/0112717 A1* | 4/2014 | Yu | E01C 11/16 404/72 |
| 2015/0110556 A1* | 4/2015 | Kadrmas | E01C 7/185 404/82 |
| 2016/0208098 A1* | 7/2016 | Naidoo | C08L 95/00 |

\* cited by examiner

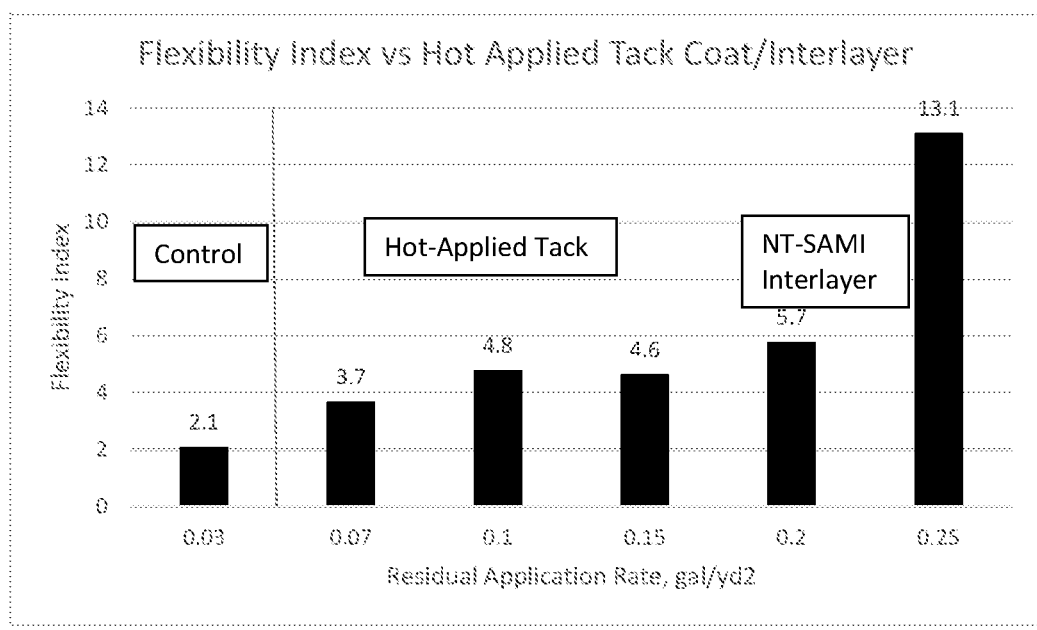

BINDER COMPOSITION FOR IMPROVED TACK COAT AND STRESS ABSORBING MEMBRANE INTERLAYER APPLICATION FOR ROAD CONSTRUCTION

RELATED APPLICATION

This application is based on U.S. Provisional Application Ser. No. 62/349,875, filed Jun. 14, 2016 to which priority is claimed under 35 U.S.C. § 120 and of which the entire specification is hereby expressly incorporated by reference.

BACKGROUND

The present invention relates generally to the installation, repair, and preventive maintenance of asphalt paved surfaces. More particularly the present invention relates to a hot-applied binder composition for use in tack coat applications, stress absorbing membrane interlayers (SAMI) and non-tracking stress absorbing membrane interlayers (NT-SAMI) for asphalt paving and road construction. More specifically, the present invention relates to a non-tracking, hot-applied binder application with improved low temperature flexibility for use beneath asphalt mix courses.

In the installment of asphalt paving mix courses for the purpose of building, repairing or maintaining existing roads, the application of an adhesive material is required beneath the mix courses to provide a bond to the existing, underlying surface. This application of adhesive material is also required between mix courses when constructing new roads.

Inadequate adhesion beneath or between asphalt mix courses can often lead to premature cracking, delamination or slippage beneath and/or between mix courses and the overall failure of roadways. The results of premature failure can be dangerous for vehicular traffic and generally are costly to correct for responsible agencies and taxpayers.

Adhesive materials for bonding asphalt mix courses are known in the art and are referred to as tack coats. A typical tack coat may be comprised of a certain percentage of asphalt cement liquid, emulsifiers, water or other additives and may be applied at hot, warm or ambient climate temperatures.

A common phenomenon associated with asphaltic emulsions (comprised of asphalt cement, water and emulsifier) when used in tack coat compositions is that a certain amount of curing time is required to release the water phase of the emulsions. Application rates are usually in the range of 0.05 to 0.15 gallon per square yard of about 60% asphalt content emulsion. Generally, curing times run from the start of the tack coat application to the beginning of asphalt mix course installation. The minimum curing time is determined by the speed that water is released from the asphalt emulsion material. Higher application rates take longer to cure and create traction issues for the construction equipment. During the curing time which can run from 15 minutes to hours, it is often the case that the traveling public is not permitted to drive on the tack coat, resulting in costs related to roadway lane closures or detouring of traffic. Ironically, during this curing period it is a very common industry practice for asphalt paving equipment and asphalt mix hauling trucks to drive on the tack coat application. The results of this common practice often lead to the tack coat being displaced, picked up or tracked away by the haul vehicle tires or tracks from its intended area of adhesion. As a result this practice can lead to incomplete bonding in the areas damaged by construction traffic which corresponds often with the wheel paths of traffic later.

Tack coats may be comprised of liquid asphalt cement and are typically applied at elevated temperatures and are generally referred to as "hot-applied tack coats". Typical application rates of hot-applied tack coats are about 0.05 to 0.1 gallon per square yard. Paving grade asphalt cements have been used, with a range of different consistencies, from softer grades, such as 150 penetration or higher, to harder grades with penetrations below 100. While these materials only require the temperature to drop to typically below 140° F. prior to the beginning of paving, they often are still prone to picking up on paving equipment tires or tracks. An inadequate amount of tack coat material, prior to the placement of the hot mix asphalt paving course, results in premature pavement failures, such as described above in reference to the use of asphalt emulsion tack coat materials.

In an effort to overcome tracking issues associated with asphalt emulsion tack coats or hot-applied tack coats, a category classified as "non-tracking tack coat" materials have been developed. The non-tracking tack coat materials have been implemented in the form of asphalt emulsion and hot-applied asphalt materials. While application rates may be similar to other hot-applied tack coats, due to the harder asphalt used in the formulation, higher application rates may be used, reported to be as high as 0.2 gallon per square yard. Hot-applied, non-tracking tack coats are reported to cure faster than conventional hot-applied tack coats and asphalt emulsion tack coats. Hot-applied, non-tracking tack coats are typically comprised of asphalt liquid cements having a penetration (pen) of less than 40 dmm. These low pen materials result in brittle behavior for their intended use in tack coat applications and as a result of the brittleness lead to bond failure demonstrated by premature longitudinal wheel path cracking and delamination of asphaltic mix courses.

An additional issue with emulsified tack coats is that generally if they are applied at too high of an application rate they run (flow) before curing due to the low viscosity of the emulsions. When paving on hills or curves with grades this problem of running (flowing) often is dealt with by reducing the application rate. While highway agencies want a higher rate applied, it is difficult with to achieve higher rates with emulsions which represent at least 95% of all tack coats used today. Further contractors do not like the mess of the emulsion tack coats on their equipment so they often apply the lightest rate that they can without the highway agencies stopping them. In most cases, if left to the contractors, no tack coat would be applied.

Stress absorbing membrane interlayers (SAMI) are typically asphalt binders applied, either hot or in an emulsion format, over an existing distressed pavement, most commonly asphalt concrete pavements. The application rates are greater than typically used in tack coat applications, typically 0.4 gallon per square yard or higher for an emulsion based product. The asphalt binders are polymer modified to provide greater elasticity with the ability to resist underlying pavement stresses from transmitting into the new asphalt overlay. After application of the SAMI binder, aggregate is placed over the binder to prevent construction equipment or vehicular traffic from picking up the binder. The textured surface created by the embedded aggregate in the SAMI provides a mechanical interlock with the new asphalt overlay. While the interlock aids in the ability to compact the new overlay, the uncoated aggregate surface lacks an actual adhesive bond to the new overlay. The lack of an adhesive bond between the SAMI and the new overlay may result in longitudinal wheel path cracking.

BRIEF SUMMARY

According to various features, characteristics and embodiments of the present invention which will become apparent as the description thereof proceeds, the present invention provides a non-tracking tack coat or stress absorbing membrane interlayer (SAMI) formed across the entire width of a pavement surface which non-tracking tack coat or SAMI is applied on the pavement surface as binder composition that comprises:
   an asphalt binder;
   an elastomeric polymer; and
   a wax modifier.

The present invention further provides a method of installing an asphalt pavement which comprises:
   providing a surface to be paved,
   applying a non-tracking layer of a binder composition across the entire width of the surface to be paved, which binder composition comprises:
      an asphalt binder;
      an elastomeric polymer; and
      a wax modifier, and
   applying a hot-mix asphalt layer over the binder layer to form an asphalt pavement.

In further embodiments provided by the present invention the binder composition also includes at least one of:
   i) fumed silica or fumed alumina; and
   ii) a saponified fatty acid and a resin acid gelling compound.

DETAILED DESCRIPTION OF THE DRAWINGS

The present invention will be described with reference to the attached drawing which is given as a non-limiting example only, in which:

FIG. 1 is a graph of the Flexibility Index vs. Hot Applied Tack Coat/Interlayer results discussed in the working Examples below.

DETAILED DESCRIPTION OF THE DRAWINGS AND THE PRESENTLY PREFERRED EMBODIMENTS

The present invention provides for the installation, repair, and preventive maintenance of asphalt paved surfaces and involves the use of a hot-applied binder composition. The binder composition of the present invention can be used in tack coat applications and stress absorbing membrane interlayers (SAMI) for asphalt paving and road construction. The binder composition provides for non-tracking, hot-applied binder applications with improved low temperature flexibility for use beneath asphalt mix courses The binder composition of the present invention involves the use of a softer polymer modified asphalt that creates a non-tracking tack coat or stress absorbing membrane interlayer (SAMI or NT-SAMI).

Softer base asphalts, as measured by penetration or modulus by bending beam rheometer, are typically more ductile or flexible than harder base asphalts. Polymer modification can aid in building stiffness without deteriorating the low temperature behavior of the modified asphalt. Softer asphalts modified with elastomeric polymers have very strong adhesive properties and typically can be very sticky, even at ambient temperatures.

Applicants co-pending application Ser. No. 15/064,819, filed Mar. 9, 2016 now U.S. Pat. No. 9,732,478, which is expressly incorporated herein by reference, describes a void reducing asphalt membrane composition that was developed for use in forming a longitudinal asphalt pavement construction joints where adjacent paved courses or passes abut one another. The area along such longitudinal asphalt pavement construction joints is higher in air voids, creating permeability to air and water causing the joint to be subject to oxidization and aging more rapidly than the rest of the pavement. As disclosed in co-pending application Ser. No. 15/064,819, now U.S. Pat. No. 9,732,478, the void reducing asphalt membrane compositions were formulated so as to be resistant to lateral flow prior to paving over with hot mix asphalt in order to remain in the joint area in sufficient quantity to fill voids. At the same time the void reducing asphalt membrane composition was formulated so that it can be applied in a sufficient thickness to allow it to migrate upward into a freshly placed asphalt overlay during a paving process to reduce air voids and reduce water permeability. Applicants' co-pending application Ser. No. 15/064,819 teaches that a conventional tack coating can be provided under a first or previous pass alone or together with a band of the void reducing asphalt membrane composition.

The present invention is based upon the use of applicants' void reducing asphalt membrane composition as a hot-applied binder composition for use in tack coat applications and stress absorbing membrane interlayers (SAMI) for asphalt paving and road construction.

The binder composition of the present invention can be applied as a coating on an existing pavement surface that defines the first substrate in the area where an overlay of asphalt concrete will be placed. The binder composition is applied so as to provide a non-tracking tack coat or SAMI beneath the area of the new pavement lift in a sufficient thickness to create a bond to the existing surface and the new overlay. When applied at rates from 0.1 to 0.15 gallon per square yard, the binder composition coating can act as a non-tracking, flexible tack coat. When applied at higher application rates such as 0.15 to 0.6 gallon per square yard the non-tracking tack coat performs as a SAMI and can migrate upward into the new asphalt mixture lift overlay to improve the low temperature cracking characteristic of the asphalt mixture overlay.

The non-tracking tack coat or SAMI formed by applying the binder composition of the present invention can be driven over by construction equipment or public vehicular traffic without being displaced or picked up on tires/tracks and removed from its intended location right after being applied.

The non-tracking characteristic of the binder composition simplifies the construction process from being a two stage process to a single stage process. That is, the conventional additional separate stage or step in which an aggregate layer must be applied over a conventional tack coat or SAMI for the purpose of preventing pick up and tracking of the binder can be avoided. Thus the binder composition of the present invention allows for faster construction and lower construction cost.

A further advantage of the present binder composition can be realized by considering that after an aggregate layer is applied over a polymer modified emulsion SAMI, it must be allowed to cure prior to paving. Such a necessary curing time (which is not required by the binder composition of the present invention) can delay paving for hours.

A non-tracking tack coat or SAMI provided by application of the present binder composition will not flow laterally from its intended placement location. Test results using a bending beam rheometer, which characterizes the low temperature characteristics of a binder, have shown such a non-tracking tack coat or SAMI will perform well at temperatures of −28° C. or lower. This low temperature performance grading is typically better than binders used in the asphalt compositions that are applied as top paving courses or passes on top of a tack coat or SAMI. The addition of higher application rates of improved low temperature non-tracking tack coat or SAMI at the interface between pavement layers imparts greater mixture flexibility to resist cracking from traffic loading as well as temperature changes.

A non-tracking tack coat or SAMI produced by the binder composition of the present invention will adhere to any type of existing pavement surface including asphalt concrete, Portland cement concrete, milled asphalt concrete or Portland cement concrete or brick or chip seal surface.

The binder composition of the present invention generally comprises a mixture of an asphalt binder, elastomeric polymers, a thickener and additive to reduce tackiness. An exemplary composition includes an asphalt binder, elastomeric polymers, a wax modifier and can include fumed silica and/or fumed alumina and a saponified fatty acid and a resin acid gelling compound.

The asphalt binder is the main component of the composition and provides the material strength. The asphalt binder can comprise 85 to 97 wt. % of the composition and more preferably 90 to 93 wt. % of the composition. Suitable asphalt binders include paving grade asphalts including; performance graded, viscosity graded or/and penetration graded.

The composition includes an elastomeric polymer component that allows an application of the binder composition to expand and contract elastically. The polymer component creates a polymer modified asphalt binder in combination with the asphalt binder component. Suitable examples of this polymer component include Styrene-Butadene-Styrene (SBS), Styrene-Butadene Rubber (SBR), Ethylene-Styrene-Interpolymers (ESI), Evaloy (an ethylene terpolymer available from Dupont), and other elastomeric polymers that are used in polymer modified asphalt compositions. This polymer component can comprise 1 to 6 wt. % of the composition and more preferably 2 to 5 wt. % of the composition.

The wax modifier reduces the viscosity of the composition at the paving temperature so that during a paving process the composition can migrate upward into a freshly placed asphalt overlay. Furthermore, at pavement surface temperature, the wax modifier provides stiffness which reduces issues with tracking. Suitable wax modifiers include, but are not limited to, waxes of vegetable (e.g. carnuba wax), animal (e.g. beeswax) mineral (e.g. Montan™ wax from coal, Fischer Tropsch wax from coal) or petroleum (e.g. paraffin wax, polyethylene wax, Fischer-Tropsch wax from gas) origin including oxidized waxes; amide waxes (e.g. ethylene bis stearamide, stearyl amide, stearylstearamide); fatty acids and soaps of waxy nature (e.g. aluminum stearate, calcium stearate, fatty acids). The wax modifier also improves cohesion properties of the composition. The wax modifier can comprise 1 to 5 wt. % of the composition and more preferably 2 to 4 wt. % of the composition.

The fumed silica and/or fumed alumina function as fillers and impart resistance to flow immediately after application and give a non-tacky character to the composition that prevents pick-up by construction and non-construction equipment before paving is complete.

The fumed silica and fumed alumina can be used alone or together in any desired proportion. The total amount of fumed silica and/or fumed alumina can comprise 1 to 10 wt. % of the composition and more preferably 3 to 6 wt. % of the composition.

The saponified fatty acid and resin acid gelling compound functions to control the rate at which the composition sets or cures. Suitable saponified fatty and resin acid gelling compounds include but are not limited to crude tall or distilled tall oil. The total amount of saponified fatty acid and resin acid gelling compound can comprise 0 to 3 wt. % of the composition and more preferably 1 to 2 wt. % of the composition.

A typical formulation of the binder composition is made by adding the polymer component to the heated asphalt binder while shearing the mixture. After or before the polymer component and asphalt binder are thoroughly mixed the wax modifier can be added while shearing the mixture followed by the addition of the fumed silica and/or fumed alumina are and saponified fatty acid and resin acid gelling compound. The mixed binder composition should be stored under conditions of agitation and heating until application. As can be readily understood, the binder composition of the present invention is not an asphalt emulsion composition.

EXAMPLES

The present invention will be discussed with reference to the following non-limiting examples which are to be considered merely representative of the present invention and, thus, should not be considered as limiting.

For these examples the binder composition of the present invention was applied in various application amounts (or rates) as a tack coat layer and stress absorbing membrane interlayer (SAMI) between an existing pavement and a new hot mix asphalt (HMA) surface pavement. The sections were stationed in 500 foot lengths, with test sections on both sides of the existing pavement which was an older HMA surface with moderate to severe cracking. The test sections were crack mapped and video recorded prior to paving. The paving was a 2 inch intermediate HMA followed by a 1 inch surface layer. The hot-applied tack and SAMI test sections were placed over the old HMA surface prior to the new paving.

The formulation of the binder composition used in these Examples is listed in Table 1 as follows:

TABLE 1

| Component | Amount (wt. %) |
| --- | --- |
| Asphalt binder | 91.7 |
| Elastomeric polymer | 3.2 |
| Sulfur | 0.1 |
| Wax Modifier | 2 |
| Fumed Silica | 3 |

A control test section was included that contained an SS-1h emulsion diluted 60:40 with water. The diluted emulsion was sprayed at 0.08 gal/yd$^2$ resulting in 0.03 gal/yd$^2$ residual asphalt.

The hot-applied tack was applied in amounts of 0.07, 0.10 and 0.15 gal/yd$^2$. The same material was applied at 0.20 and 0.25 gal/yd$^2$ to create a non-tracking stress absorbing membrane interlayer (NT-SAMI). Application rates were checked by placing a 3×3 foot piece roofing felt on the pavement and spraying over and then weighing the roofing felt. Results are shown in the Table 2 below.

TABLE 2

Test Application Rates

| Target Rate, gal/yd$^2$ | Measured Rate, gal/yd$^2$ |
|---|---|
| 0.07 | 0.071 |
| 0.10 | Did not measure |
| 0.15 | 0.152 |
| 0.20 | 0.204 |
| 0.25 | 0.286 |

The hot-applied tack and NT-SAMI did not pick up on the tires of the truck or paver that were used to apply the asphalt binder composition. The tires did create a "Velcro" sound when moving over the tack. The 0.25 gal/yd$^2$ test section was a very heavy appearing application. The asphalt film was heavy enough to begin to fill ¼ inch wide cracks in the existing pavement. The tires on the haul trucks remained clean over the entire length of the test section.

Each test section including the control section was cored for laboratory testing. The cores were taken to include the tack coat and NT-SAMI material and the asphalt mixes below. The cores were then trimmed to create a composite specimen with 2" of the existing asphalt mixture, the tack coat/NT-SAMI material and the newly placed 2" HMA.

A modified Illinois Flexibility Index Test (I-FIT) procedure was performed on cores from each test section. This method is used to characterize the cracking resistance of asphalt mixtures with higher Flexibility Index values indicating a higher degree of resistance to cracking. The test is conducted at 25° C. and a controlled strain rate of 50 mm/min. The energy to propagate a crack through a test specimen is calculated. Results are shown in the Table 3 below and also in FIG. 1 which is a graph of the Flexibility Index vs. Hot Applied Tack Coat/Interlayer results.

TABLE 3

| Specimen | Energy, J/m$^2$ | Flexibility Index |
|---|---|---|
| Section 1, 0.03 gal/yd$^2$ ss-1h Average | 1068 | 2.05 |
| Section 2, 0.07 gal/yd$^2$ Hot Track Average | 1058 | 3.65 |
| Section 3, 0.10 gal/yd$^2$ Hot Track Average | 1714 | 4.76 |
| Section 4, 0.15 gal/yd$^2$ Hot Track Average | 1180 | 4.61 |
| Section 5, 0.20 gal/yd$^2$ NT-SAMI Average | 1246 | 5.75 |
| Section 6, 0.25 gal/yd$^2$ NT-SAMI Average | 1979 | 13.09 |

The cores from the control section where conventional tack was applied at 0.03 gal/yd$^2$ yielded a Flexibility Index of 2.1.

Cores from the test sections at different application rates of hot-applied tack are on average double the flexibility index as compared to the control section.

Cores from the test sections where the hot-applied tack coat was applied at higher rates to act as a non-tracking stress absorbing membrane interlayer, were 3 to 6 times higher on Flexibility Index.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A non-tracking tack coat or stress absorbing membrane interlayer formed on pavement surface which non-tracking tack coat or stress absorbing membrane interlayer is applied across the entire width of the pavement surface as a binder composition that comprises:
    an asphalt binder;
    an elastomeric polymer,
    a wax modifier; and
    at least one of:
        i) fumed silica or fumed alumina; and
        ii) a saponified fatty acid and a resin acid gelling compound,
    wherein the asphalt binder comprises 85 to 97 wt. % of the binder composition.

2. A non-tracking tack coat or stress absorbing membrane interlayer according to claim 1, wherein the binder composition comprises fumed silica or fumed alumina which imparts a non-tacky character to the binder composition.

3. A non-tracking tack coat or stress absorbing membrane interlayer according to claim 1, wherein the binder composition is applied on the pavement surface at an application rate of 0.15 to 0.6 gallon per square yard.

4. A non-tracking tack coat or stress absorbing membrane interlayer according to claim 1, wherein the binder composition is applied on the pavement surface at an application rate of 0.10 to 0.15 gallon per square yard.

5. A non-tracking tack coat or stress absorbing membrane interlayer according to claim 1, wherein the pavement surface comprises one of asphalt concrete, Portland cement concrete, milled asphalt concrete or Portland cement concrete or brick or chip seal surface.

6. A non-tracking tack coat or stress absorbing membrane interlayer according to claim 1 having an asphalt pavement layer formed thereon.

7. A method of installing an asphalt pavement which comprises:
    providing a surface to be paved,
    applying a non-tracking layer of a binder composition across the entire width of the surface to be paved, which binder composition comprises:
        an asphalt binder;
        an elastomeric polymer; and
        a wax modifier; and
        at least one of:
            i) fumed silica or fumed alumina; and
            ii) a saponified fatty acid and a resin acid gelling compound,
        wherein the asphalt binder comprises 85 to 97 wt. % of the binder composition, and
    applying a hot-mix asphalt layer over the binder layer to form an asphalt pavement.

8. The method of installing an asphalt pavement according to claim 7, wherein the binder composition is applied as a tack coat.

9. The method of installing an asphalt pavement according to claim 8, wherein the binder composition is applied on the surface at an application rate of 0.10 to 0.15 gallon per square yard.

10. The method of installing an asphalt pavement according to claim 7, wherein the binder composition is applied as a stress absorbing membrane interlayer.

11. The method of installing an asphalt pavement according to claim 7, wherein the binder composition is applied on the surface at an application rate of 0.15 to 0.6 gallon per square yard.

12. The method of installing an asphalt pavement according to claim 7, wherein the surface comprises one of asphalt concrete, Portland cement concrete, milled asphalt concrete or Portland cement concrete or brick or chip seal surface.

13. The method of installing an asphalt pavement according to claim 7, wherein the hot-mix asphalt layer is applied over the binder layer without an intermediate layer.

14. The method of installing an asphalt pavement according to claim 7, wherein the binder composition comprises fumed silica or fumed alumina which imparts a non-tacky characteristic to the binder composition.

* * * * *